United States Patent
Hanson et al.

(10) Patent No.: US 11,263,161 B2
(45) Date of Patent: Mar. 1, 2022

(54) SMART TEST LINK DONGLE

(71) Applicant: Hamilton Sundstrand Corporation, Charlotte, NC (US)

(72) Inventors: Michael J. Hanson, Rockford, IL (US); Josh C. Swenson, Rockford, IL (US); Ronald G. Knight, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 2088 days.

(21) Appl. No.: 14/557,984

(22) Filed: Dec. 2, 2014

(65) Prior Publication Data
US 2016/0154754 A1 Jun. 2, 2016

(51) Int. Cl.
*G06F 13/38* (2006.01)
*H04L 61/5014* (2022.01)
*H04L 43/50* (2022.01)
*G06F 13/40* (2006.01)
*H04L 61/5038* (2022.01)
*G06F 9/4401* (2018.01)

(52) U.S. Cl.
CPC .......... *G06F 13/385* (2013.01); *G06F 9/4411* (2013.01); *G06F 13/4022* (2013.01); *H04L 43/50* (2013.01); *H04L 61/2015* (2013.01); *H04L 61/2038* (2013.01)

(58) Field of Classification Search
CPC . H01L 61/2038; H01L 43/50; H01L 61/2015; H01L 41/0816; H01L 12/24; H01L 12/26; H01L 29/12; H01L 41/0886; H01L 67/34; H01L 41/0893; H01L 41/0809; H01L 43/18; H01L 43/045; G06F 9/4411; G06F 13/385; G06F 13/4022; G06F 9/4416; G06F 9/44; G06F 13/38; G06F 13/40; G06F 3/04842
See application file for complete search history.

(56) References Cited

U.S. PATENT DOCUMENTS

| | | | | |
|---|---|---|---|---|
| 2004/0010653 | A1* | 1/2004 | Grundy | H04L 12/56 710/315 |
| 2006/0114835 | A1* | 6/2006 | Horoschak | H04L 29/12 370/252 |
| 2007/0036154 | A1* | 2/2007 | Lipman | H02J 7/0044 370/356 |
| 2007/0127460 | A1* | 6/2007 | Wilber | H04L 49/602 370/389 |
| 2007/0250212 | A1* | 10/2007 | Halloran | A47L 5/30 700/245 |

(Continued)

*Primary Examiner* — Lee E Rodak
*Assistant Examiner* — Brent J Andrews
(74) *Attorney, Agent, or Firm* — Locke Lord LLP; Daniel J. Fiorello; Gabrielle L. Gelozin

(57) ABSTRACT

A dongle for connecting a computerized device to a certified unit under test (UUT) includes a computerized device communication port and a UUT communication port. The dongle also includes a communication module operatively connecting the computerized device communication port and the UUT communication port. The communication module includes an internet protocol (IP) module that supplies an IP address to a computerized device connected to the computerized device communication port, wherein the IP address enables the computerized device to receive signals from and/or send signals to the UUT.

15 Claims, 2 Drawing Sheets

(56) References Cited

U.S. PATENT DOCUMENTS

| | | | | |
|---|---|---|---|---|
| 2007/0268516 | A1* | 11/2007 | Bugwadia | H04L 41/0886 358/1.15 |
| 2009/0228722 | A1* | 9/2009 | Lin | H04L 12/10 713/300 |
| 2012/0259911 | A1* | 10/2012 | Meierer | H04B 1/0458 709/203 |
| 2015/0180743 | A1* | 6/2015 | Jana | H04L 43/045 715/736 |
| 2016/0046376 | A1* | 2/2016 | Wischmeyer | B64D 45/00 701/3 |

* cited by examiner

SMART TEST LINK DONGLE

BACKGROUND

1. Field

The present disclosure relates to test equipment, and more particularly to test links for connection between line replaceable units and computers.

2. Description of Related Art

An Ethernet test link can be used for both factory test and field maintenance of electronic line replaceable units (LRU's) such as Generator Control Units (GCU's) and Secondary Power Distribution Assemblies (SPDA's) for aircraft. The test link plugs into a PC or laptop computer and into the Unit-Under-Test (UUT). The UUT software interacts with software running on the PC to allow operations such as downloading new software into the UUT, "peeking" UUT addresses for diagnostic information, and uploading the contents of non-volatile memory (NVM) for analysis.

A dongle can be disposed between the UUT and the PC and may provide two mode switches. Two types of mode switches that can be provided are called "boot only enable" and "test link enable", configure the operational and test link modes in the UUT.

The UUT contains flight software that is written and verified to certain Federal Aviation Administration (FAA) regulations (DO-178B or DO-178C). The DO-178 certification adds significant cost to software development. Consequently, the UUT test link software is traditionally very simple in comparison to software running on a PC. While a UUT may include User Datagram Protocol (UDP) and Internet Protocol (IP) wrappers, The UUT test link software lacks most of the intelligence that the IP Suite provides and therefore, despite using Ethernet, is not interoperable with Local Area Networking (LAN) infrastructure.

Thus, the simplicity of the UUT test link software avoids significant product development costs, but requires customized PC's used to interact with the UUT. For example, the PC must employ fixed IP addresses. This, combined with other necessary adaptations to the PC and PC software constitute a customized PC. Such customizations typically require administrative privileges, and are in conflict with the Information Technology (IT) policies of most companies. This conflict requires a user company to purchase, configure, deploy, and support customized PC's used as test equipment for UUTs.

Such conventional methods and systems have generally been considered satisfactory for their intended purpose. However, there is still a need in the art for improved communication interfaces between computerized devices and UUTs. The present disclosure provides a solution for this need.

SUMMARY

A dongle for connecting a computerized device to a certified unit under test (UUT) includes a computerized device communication port and a UUT communication port. The dongle also includes a communication module operatively connecting the computerized device communication port and the UUT communication port. The communication module includes an Internet Protocol (IP) module that supplies an IP address to a computerized device connected to the computerized device communication port, wherein the IP address enables the computerized device to receive signals from and/or send signals to the UUT.

The communication module can further include a mode switching module having at least two states including an operational mode and a test mode. The mode switching module can be operatively connected to a mode switch to switch the mode switching module between the at least two states.

The IP module can include a Dynamic Host Configuration Protocol (DHCP) server. The dongle can include a power port for supplying the IP module with electrical power. In certain embodiments, the dongle can include a battery for supplying the IP module with electrical power.

The dongle can include a power switch to supply power to the IP module. The power port can include a universal serial bus (USB) port for connecting to the computerized device.

In certain embodiments, the computerized device communication port can include power over Ethernet (PoE). The computerized device communication port can be a wireless communication port. The UUT communication port can be a wireless communication port.

In at least one aspect of this disclosure, a method can include receiving a request for an internet protocol (IP) address from a computerized device, supplying an IP address to the computerized device that allows communication between a unit under test (UUT) and the computerized device, and bridging communication between the computerized device and the UUT using the IP address.

The method can include sending a mode signal to the UUT. Sending the mode signal can include sending a test mode signal to the UUT instructing the UUT to operate in a test mode. Sending the mode signal can include sending a boot mode signal to the UUT instructing the UUT to operate in a boot mode. In certain embodiments, sending the mode signal can include sending an operational mode signal to the UUT instructing the UUT to operate in an operational mode.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
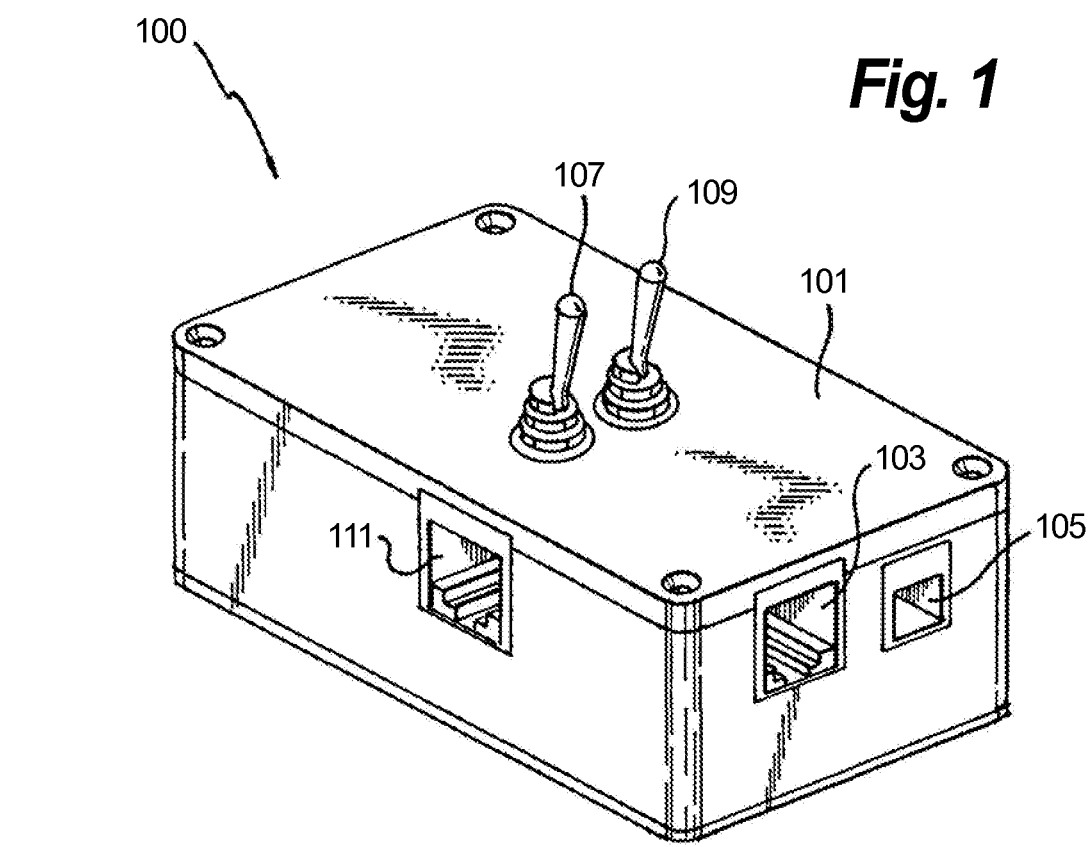
FIG. 1 is a perspective view of an embodiment of a dongle in accordance with this disclosure, showing two communication ports and a power port.
Figure 2:
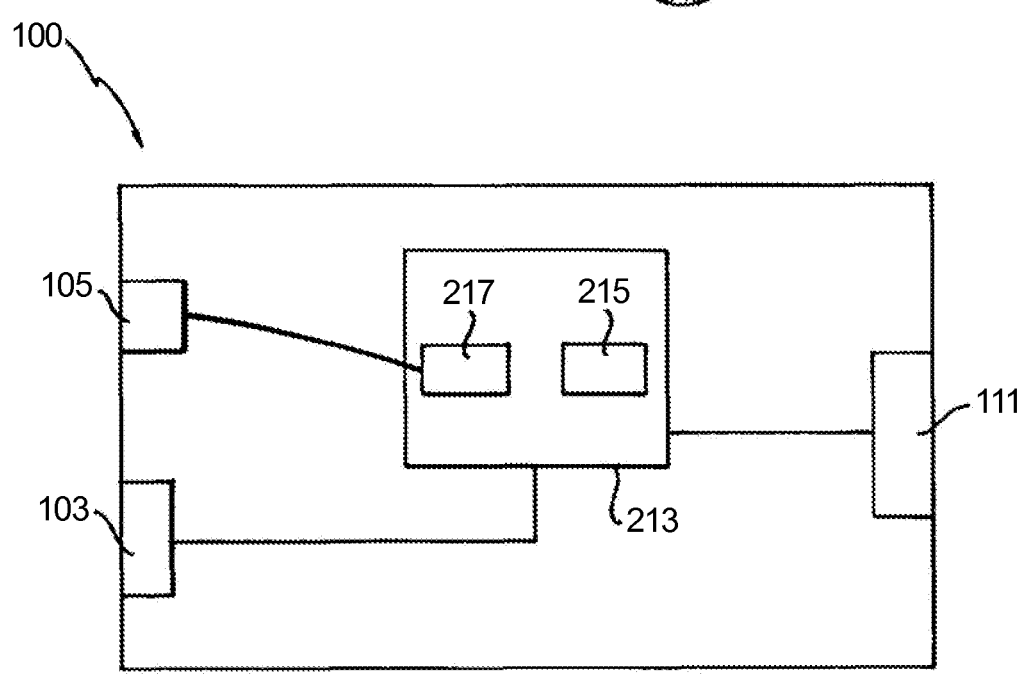
FIG. 2 is a schematic of the dongle of FIG. 1, showing modules operatively connecting to the ports.
Figure 3:
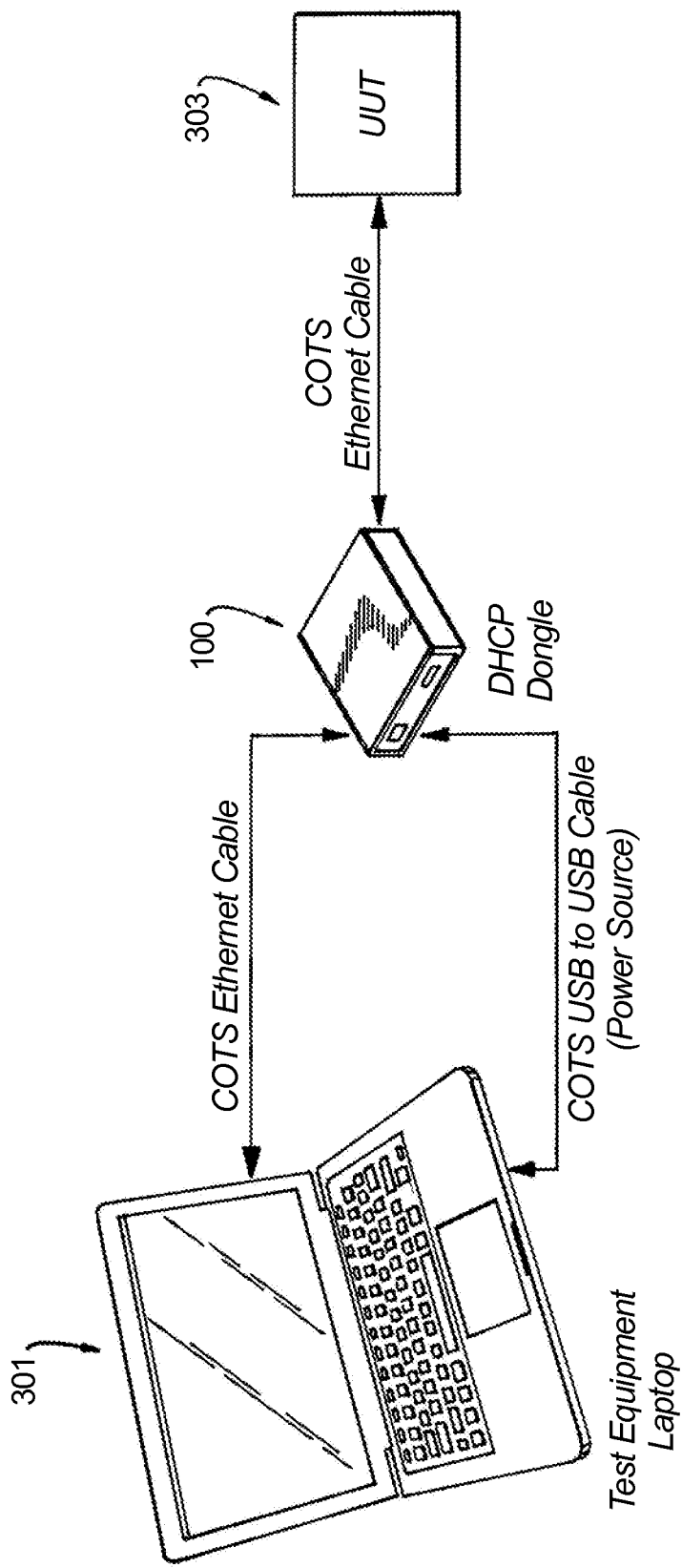
FIG. 3 illustrates a system in accordance with this disclosure, schematically showing use of a dongle as described herein.

Reference will now be made to the drawings wherein like reference numerals identify similar structural features or aspects of the subject disclosure. For purposes of explanation and illustration, and not limitation, an illustrative view of an embodiment of a dongle in accordance with the disclosure is shown in FIG. 1 and is designated generally by reference character 100. Other aspects of this disclosure are shown in FIGS. 2 and 3. The systems and methods described herein can be used to connect a computerized device to a unit under test (UUT) which does not have Internet Protocol (IP) infrastructure.

Referring to FIGS. 1 and 2, a dongle 100 for connecting a computerized device (e.g., a laptop PC, a mobile device) to a certified unit under test (UUT) (e.g., a line replaceable unit (LRU) for an aircraft) includes a computerized device communication port 103 and a UUT communication port 111. The ports 103, 101 can include an Ethernet cable connection and/or any other suitable type of communication port. In certain embodiments, the computerized device communication port 103 can include a wireless communication port. In certain embodiments, the UUT communication port 111 can include a wireless communication port.

Referring to FIG. 2, the dongle 100 also includes a communication module 213 operatively connecting the computerized device communication port 103 and the UUT communication port 111. The communication module 213 includes an internet protocol (IP) module 217 that supplies an IP address to a computerized device connected to the computerized device communication port 103. The IP address enables the computerized device to receive signals from and/or send signals to the UUT through the dongle 100. The communication module 213 can include any suitable hardware (e.g., memory, processor, electrical components) and/or software (suitable computer code) configured to allow communication between the computerized device and the UUT.

For example, the IP module 217 can include a server and/or any suitable software associated with the communication module 213 that is configured to receive IP requests from a computerized device and then respond to the request with a suitable IP address to allow the computerized device to connect to the communication module 217. In certain embodiments, the IP module 217 can include a dynamic host configuration protocol (DHCP) server.

In certain embodiments, the dongle 100 can further include a power port 105 for supplying the IP module 217 and/or the communication module 213 in general with electrical power. For example, the power port 105 can include a universal serial bus (USB) port for connecting to the computerized device and/or any other suitable port type. In certain embodiments, the dongle 100 can additionally or alternatively include a battery operatively connected to the communication module 213 for supplying electrical power to one or more of the modules. It is contemplated that the Power over Ethernet (PoE) or the like can be used to transmit power along the communication line through the computerized device communication port 103. Use of PoE can eliminate the need for a separate power port 105 for embodiments with external power supply.

The dongle 100 can include a power switch 107 to allow the flow of electrical power from the power port 105 and/or a battery. It is contemplated that a power switch 107 need not be included.

The communication module 213 can further include a mode switching module 215 having at least two states (e.g., an operational mode, a test mode, a boot mode). The mode switching module 215 can be operatively connected to one or more mode switches 109 to switch the mode switching module 215 between the at least two states. In certain embodiments, the one or more mode switches 109 can cause the mode switching module 215 to instruct the UUT to 1) ignore all Ethernet traffic and operate in normal "flight" mode, 2) enable Ethernet traffic while running normal UUT functionality, or 3) enter a special "boot" mode that allows software updates or low-level hardware diagnostics.

It is contemplated that switch 215 can be used to configure the functionality of the dongle 100 additionally or alternatively to the mode of the UUT. It is further contemplated that the dongle 100 does not need to include a mode switch 215 (or any other switch). For example, the dongle 100 may be configured to operate the UUT in only a single mode type or alternatively have automated or digital mode switching.

Referring to FIG. 3, in at least one aspect of this disclosure, a method can include receiving a request for an internet protocol (IP) address from a computerized device 301, supplying an IP address to the computerized device 301 that allows communication between a unit under test (UUT) 303 and the computerized device 301, and bridging communication between the computerized device 301 and the UUT 303.

Bridging communication between the computerized device 301 and the UUT 303 can include allowing the dongle 100 to act as an Ethernet switch which behaves like a simple Ethernet switch in an office environment. Each "node" (computerized device 301, dongle 100, or UUT 303) responds to packets they are designed to process.

Bridging communication between the computerized device 301 and the UUT 303 can include allowing the dongle 100 to act like a router or a "translator" between the computerized device 301 and UUT 303. For example, if the dongle 100 provides a DHCP server, the connection may be best implemented as an Ethernet switch as described above because once the computerized device 301 has an IP address, it can then communicate directly with the UUT 303. However, use of a standard web browser to access the UUT 303 may require the dongle 100 to behave as a "translator", keeping the UUT 303 and computerized device 301 on separate logical networks. It is contemplated that the above described modes of bridging can co-exist on a single dongle 100.

The method can include sending a mode signal to the UUT 303. Sending the mode signal can include sending a test mode signal to the UUT 303 instructing the UUT 303 to operate in a test mode as described above. Sending the mode signal can include sending a boot mode signal to the UUT 303 instructing the UUT 303 to operate in a boot mode as described above. In certain embodiments, sending the mode signal can include sending an operational mode signal to the UUT 303 instructing the UUT 303 to operate in an operational mode as described above.

In many cases, a computerized device 301 will issue a DHCP request in an attempt to integrate into any network it has been electrically connected to. The dongle 100 can answer such a request and bridges the connection to the UUT 303 which does not require configuring the computerized device to have a fixed IP address. In this case, any suitable standard computerized device 301 can be used without modifying the computerized device 301.

While embodiments herein are described with respect to one computerized device 301, any suitable number of computerized devices 301 can connect to the dongle 100 and/or any other networking service. Additionally, using standard HTML, Javascript, and HTTP structures installed on the communication module 213, many functions that are typically performed by custom software installed on the computerized device 301 could instead be performed by the dongle 100 and accessed with a standard web browser after connecting to the dongle 100. For example, HTTP Post can be used to download software into the UUT 303 using the dongle 100 to translate between the standard (but relatively complex) HTTP Post mechanisms and the simple (but custom) UUT 303 file transfer mechanisms.

Additional intelligence can also be added to the dongle 100 as needed to support more advanced features such as symbolically referenced "peeks" and "pokes" based on symbol map files downloaded into the dongle 100. This can enable a software engineer to interrogate a unit with a standard computerized device 301 (e.g., a standard laptop).

The methods and systems of the present disclosure, as described above and shown in the drawings, provide for a dongle with superior properties including the ability to provide an IP address to a computerized device. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A dongle for connecting a computerized device to a certified unit under test (UUT), comprising:
    a computerized device communication port configured to connect directly to the computerized device;
    a UUT communication port configured to connect directly to the UUT; a communication module operatively connecting the computerized device communication port and the UUT communication port, the communication module including an internet protocol (IP) module that supplies an IP address to a computerized device connected to the computerized device communication port, wherein the IP address enables the computerized device to receive signals from and/or send signals to the UUT; and
    a mode switching module having at least two states, wherein the two states include at least two of: an operational mode, a test mode, and/or a boot mode, wherein the operational mode is configured to allow the UUT to operate in a normal mode, and wherein the test mode is configured to allow testing of the UUT.

2. The dongle of claim 1, wherein the IP module includes a dynamic host configuration protocol (DHCP) server.

3. The dongle of claim 1, further including a battery for supplying the IP module with electrical power.

4. The dongle of claim 1, wherein the mode switching module is operatively connected to a mode switch to switch the mode switching module between the at least two states.

5. The dongle of claim 1, further including a power switch to supply power to the IP module.

6. The dongle of claim 1, wherein the computerized device communication port includes power over Ethernet.

7. The dongle of claim 1, wherein the computerized device communication port is a wireless communication port.

8. The dongle of claim 1, wherein the UUT communication port is a wireless communication port.

9. The dongle of claim 1, further including a power port for supplying the IP module with electrical power.

10. The dongle of claim 9, wherein the power port includes a universal serial bus (USB) port for connecting to the computerized device.

11. A method, including:
    receiving a request for an internet protocol (IP) address directly from a computerized device;
    supplying an IP address to the computerized device that allows direct communication between a unit under test (UUT) and the computerized device using a dongle;
    bridging communication between the computerized device and the UUT through the dongle using the IP address and without further processing by the dongle; and
    switching between at least two states including at least two of an operational mode, a test mode, and/or a boot mode.

12. The method of claim 11, further including sending a mode signal to the UUT.

13. The method of claim 12, wherein sending the mode signal includes sending a test mode signal to the UUT instructing the UUT to operate in the test mode.

14. The method of claim 12, wherein sending the mode signal includes sending the boot mode signal to the UUT instructing the UUT to operate in a boot mode.

15. The method of claim 11, wherein sending the mode signal includes sending an operational mode signal to the UUT instructing the UUT to operate in the operational mode.

* * * * *